United States Patent
Naidu

(10) Patent No.: US 10,285,085 B2
(45) Date of Patent: May 7, 2019

(54) METHOD AND COMPUTING DEVICE FOR FACILITATING AND ESTABLISHING NETWORK CONNECTIVITY

(71) Applicant: Wipro Limited, Bangalore (IN)

(72) Inventor: Santhosh Kumar Mohan Naidu, Bangalore (IN)

(73) Assignee: Wipro Limited, Bangalore (IN)

(*) Notice: Subject to any disclaimer, the term of this patent is extended or adjusted under 35 U.S.C. 154(b) by 437 days.

(21) Appl. No.: 14/635,591

(22) Filed: Mar. 2, 2015

(65) Prior Publication Data

US 2016/0192404 A1  Jun. 30, 2016

(30) Foreign Application Priority Data

Dec. 29, 2014  (IN) .......................... 6684/CHE/2014

(51) Int. Cl.
| | |
|---|---|
| *H04L 29/08* | (2006.01) |
| *H04W 24/10* | (2009.01) |
| *H04W 28/18* | (2009.01) |
| *H04W 40/02* | (2009.01) |
| *H04W 88/04* | (2009.01) |

(52) U.S. Cl.
CPC .......... *H04W 24/10* (2013.01); *H04L 67/327* (2013.01); *H04W 28/18* (2013.01); *H04W 40/02* (2013.01); *H04W 88/04* (2013.01); *Y02D 70/1262* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/166* (2018.01); *Y02D 70/26* (2018.01); *Y02D 70/30* (2018.01)

(58) Field of Classification Search
CPC ..... H04W 28/18; H04W 48/18; H04W 24/10; H04W 72/0406; H04W 72/0493; H04W 72/12; H04L 65/4076; H04L 69/24
See application file for complete search history.

(56) References Cited

U.S. PATENT DOCUMENTS

| | | | |
|---|---|---|---|
| 7,535,880 B1 * | 5/2009 | Hinman | H04W 12/08 370/338 |
| 9,396,652 B2 * | 7/2016 | Leblond | |
| 9,946,685 B1 * | 4/2018 | Wood | G06F 15/17331 |

(Continued)

*Primary Examiner* — Redentor Pasia
(74) *Attorney, Agent, or Firm* — Pepper Hamilton LLP

(57) ABSTRACT

Embodiments of the present disclosure disclose a method for facilitating and establishing network connectivity. The network connectivity is established by a first computing device which is capable of identifying network parameters of available network connections and broadcasting the network parameters. The first computing device receives connection request along with connection request parameters from second computing devices to establish connection with one of the available network connections. The first computing device determines which network connection can server the connection request parameters and then facilitates the available network connection to the second computing device. The second computing device establishes the network connections with the first computing device. The second computing device identifies which are first computing devices with their network parameters can serve the connection request parameters of the second computing device.

25 Claims, 9 Drawing Sheets

(56) References Cited

U.S. PATENT DOCUMENTS

| | | | | |
|---|---|---|---|---|
| 2005/0286476 A1* | 12/2005 | Crosswy | .............. | H04W 88/10 370/338 |
| 2012/0046034 A1* | 2/2012 | Lu | ........................ | H04W 48/18 455/435.2 |
| 2016/0105424 A1* | 4/2016 | Logue | ................ | H04L 63/0823 726/7 |

* cited by examiner

METHOD AND COMPUTING DEVICE FOR FACILITATING AND ESTABLISHING NETWORK CONNECTIVITY

This application claims the benefit of Indian Patent Application Serial No. 6684/CHE/2014 filed Dec. 29, 2014, which is hereby incorporated by reference in its entirety.

FIELD

The present subject matter is related, in general to network connectivity and more particularly, but not exclusively to a method and computing devices for facilitating and establishing network connectivity.

BACKGROUND

Generally, one or more computing devices facilitate network communications and processing of data. Examples of the one or more computing devices include, but are not limited to, mobiles phones, Personal Computers (PC), laptop, tablet, smartwatch, cameras, notebook, pager, cellular devices, Personal Digital Assistant (PDA), smartphone, server computers, mainframe computers, network PC, wearable device and the like. Each of the one or more computing devices is configured to connect to Internet. The one or more computing devices use one or more network connections for establishing network connectivity with the Internet. The one or more network connections include, but are not limited to, wired network connections and wireless network connections. The one or more computing devices establish the network connectivity with the Internet using one or more communication interfaces. The one or more communication interfaces include, but are not limited to, Network Interface Controller (NIC), repeaters, hubs, bridges, switches, routers, modems and firewalls.

However, there exists a problem when the one or more computing devices cannot establish the network connectivity due to failure of the one or more network connections. For example, considering a tablet connected to the Internet through the WiFi connection. Assuming, network parameters for example, bandwidth and speed of the WiFi connection are low. In such a case, the network connectivity request received from the tablet for network connectivity with the Internet is prolonged or not processed through the WiFi connection. There exists a delay for long duration till the network connectivity with the Internet is completely established. Also, there exists a delay for long duration till data communication is successfully facilitated by the one or more available network connections.

Further, the existing methods identify the one or more network connections available by the one or more computing devices. However, the existing methods do not identify the one or more network connections capable of serving the network connectivity request which is of a great challenge. For example, considering the smartwatch requires WiFi speed of 10 Mega Bit per seconds (Mbps) for data communication. The smartphone identifies the availability of WiFi connection. However, the smartphone does not identify whether the available WiFi connection is capable of data communication with the speed as required.

Further, the existing methods do not provide notification of network parameters to the one or more computing devices. For example, the tablet using WiFi connection does not notify the smartphone with information related to the network parameters. In such a case, the smartphone is uninformed or unaware whether the one or more available network connections i.e. WiFi connection can actually serve the data communication or not with the Internet.

Furthermore, the existing methods relate to switching between the one or more available network connections when the one or more available network connections are chosen manually by a user. However, there exists a tedious job for the user to choose between the one or more available network connections when there is a failure of network connectivity through the already chosen available network connection.

SUMMARY

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

Disclosed herein is a method for facilitating network connectivity. The method comprises one or more steps performed by a first computing device. The method comprises a first step of identifying one or more network parameters of one or more available network connections. Second step of the method comprises broadcasting the one or more network parameters to one or more second computing devices. Third step of the method comprises receiving a connection request comprising connection request parameters from at least one of the one or more second computing devices and applications for using the one or more available network connections. In an embodiment, the one or more second computing devices evaluate the one or more network parameters for transmitting the connection request to the first computing device. Fourth step of the method comprises determining one of the one or more available network connections capable of serving the connection request parameters. Last step of the method comprises facilitating the one of the one or more available network connections to the one of the one or more second computing devices. The method further comprises providing one or more updated network parameters of the one or more available network connections to the one or more second computing devices subsequent to facilitating the one of the one or more network connections. The method further comprises transmitting the connection request to one or more second computing devices to facilitate network connectivity to the one of the one or more second computing devices upon identifying a failure in facilitating the one of the one or more available network connections.

In an aspect of the present disclosure, a first computing device for facilitating network connectivity is disclosed. The first computing device comprises a processor and a memory communicatively coupled to the processor. The memory stores processor-executable instructions, which, on execution, cause the processor to identify one or more network parameters of one or more available network connections. The processor is configured to broadcast the one or more network parameters to one or more second computing devices. The processor is configured to receive a connection request comprising connection request parameters from at least one of the one or more second computing devices and applications for using the one or more available network connections. The processor is configured to determine one of the one or more available network connections capable of serving the connection request parameters. The processor is configured to facilitate the one of the one or more available network connections to the one of the one or more second computing devices.

The present disclosure discloses method for establishing network connectivity. The method comprises one or more steps performed by a second computing device. First step of the method comprises identifying one or more first computing devices. Second step of the method comprises receiving one or more network parameters of one or more available network connections from the one or more first computing devices. Third step of the method comprises determining one of the one or more first computing devices capable of serving the network connectivity based on the one or more network parameters. Last step of the method comprises transmitting a connection request comprising connection request parameters to the one of the one or more first computing devices for establishing network connectivity by using one of the one or more available network connections.

In an aspect of the present disclosure, a second computing device for establishing network connectivity is disclosed. The second computing device comprises a processor and a memory communicatively coupled to the processor. The memory stores processor-executable instructions, which, on execution, cause the processor to identify one or more first computing devices. The processor is configured to receive one or more network parameters of one or more available network connections from the one or more first computing devices. The processor is configured to determine one of the one or more first computing devices capable of serving the network connectivity based on the one or more network parameters. The processor is configured to transmit a connection request comprising connection request parameters to the one of the one or more first computing devices for establishing network connectivity by using one of the one or more available network connections.

In another aspect of the present disclosure, a non-transitory computer readable medium for facilitating network connectivity is disclosed. The non-transitory computer readable medium includes instructions stored thereon that when processed by a processor cause a first computing device to perform acts of identifying one or more network parameters of one or more available network connections; broadcasting the one or more network parameters to one or more second computing devices; receiving a connection request comprising connection request parameters from at least one of one of the one or more second computing devices for using the one or more available network connections; determining one of the one or more available network connections capable of serving the connection request parameters; and facilitating the one of the one or more available network connections to the one of the one or more second computing devices based on the determination.

In another aspect of the present disclosure, a non-transitory computer readable medium for facilitating network connectivity is disclosed. The non-transitory computer readable medium includes instructions stored thereon that when processed by a processor cause a second computing device to perform acts of identifying one or more first computing devices; receiving one or more network parameters of one or more available network connections broadcasted from the one or more first computing devices; determining one of the one or more first computing devices capable of serving the network connectivity based on the one or more network parameters; and transmitting a connection request comprising connection request parameters to the one of the one or more first computing devices for establishing network connectivity by using one of the one or more available network connections.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
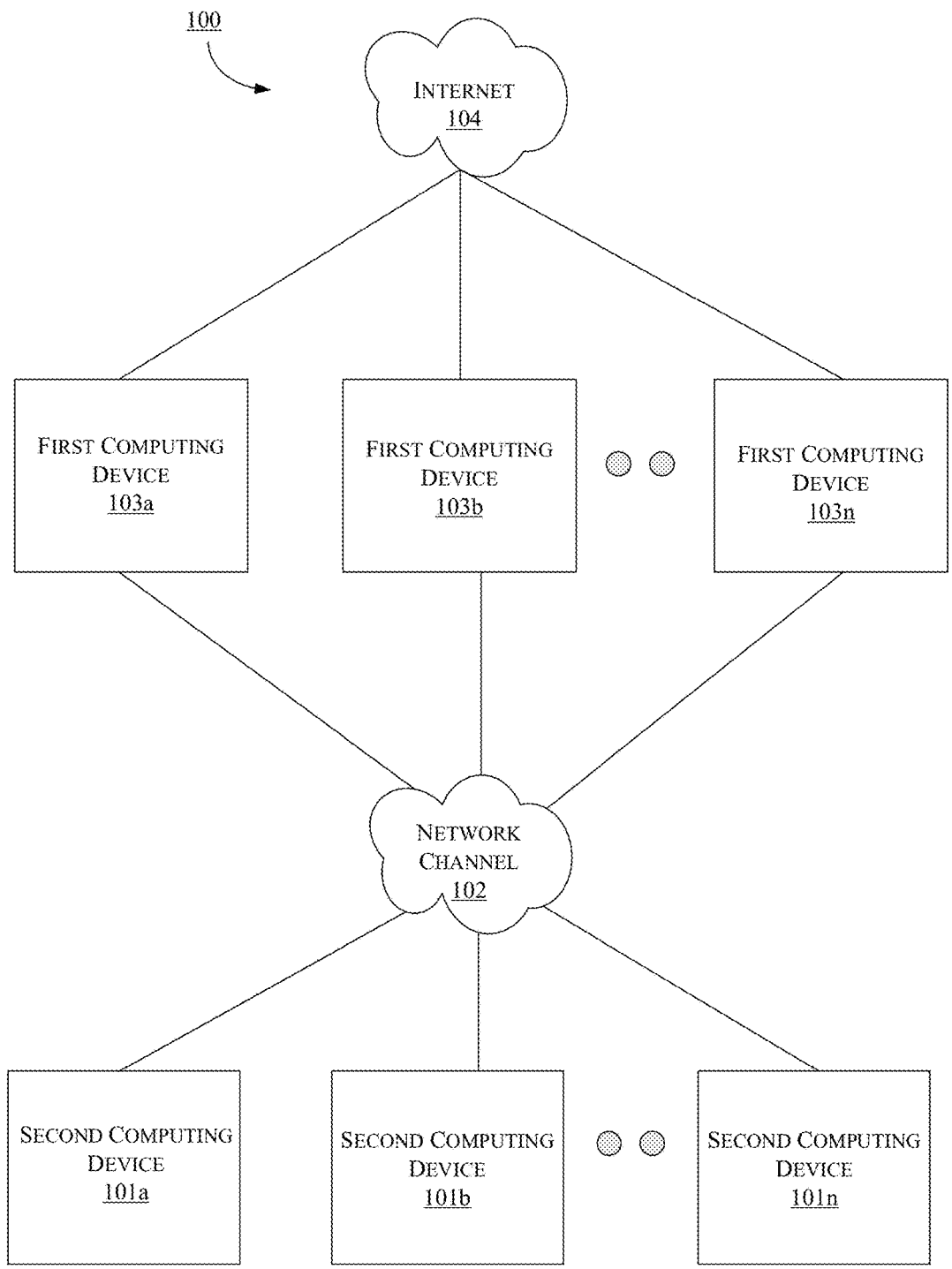
FIG. 1 illustrates an environment for facilitating and establishing network connectivity with Internet in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure are related to a method for facilitating and/or establishing network connectivity. The network connectivity with Internet is facilitated for passive devices by active devices when one or more available network connections of the passive devices do not provide connection to the Internet. The active devices are configured to connect to the Internet directly and the passive devices are configured to establish the connectivity with the Internet through the active devices. Also, the network connectivity is facilitated for one or more web based applications installed in the passive devices and/or the active devices to connect to the Internet. The network connectivity is facilitated by the active devices using one or more available network connections. The active devices identify network parameters of the one or more available network connections. Then, the active devices broadcast the network parameters of the one or more available network connections to the passive devices. Upon broadcasting, the active devices receive a connection request having request parameters from the passive devices. The connection request is received when the broadcasted network parameters are identified and/or required by the passive devices for usage. Upon receiving the connection request, the active devices determine which of the one or more network connections can serve the request parameters. The active devices facilitate the network connectivity for the passive devices using the one or more available network connection capable of serving the request parameters.

Embodiments of the present disclosure are related to a method for establishing network connectivity. The network connectivity is established by the passive devices using the one or more available network connections of the active devices. For establishing the network connectivity, the passive devices identify the active devices. Then, the passive devices determine which of the active devices is capable of serving network connectivity as per the request parameters required by the passive devices. Particularly, the passive devices determine the network parameters of the one or more available network connections capable of serving the request parameters. Upon determining capability of the active devices, the passive devices transmit the connection request to the active devices. The connection request is transmitted for establishing the network connectivity with Internet by using the one or more available network connections of the active devices.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates an environment 100 for facilitating and establishing network connectivity with Internet 104 in accordance with some embodiments of the present disclosure.

In an embodiment, the environment 100 comprises one or more computing devices and the Internet 104. Examples of the one or more computing devices include, but are not limited to, mobiles phones, Personal Computers (PC), laptop, tablet, smartwatch, cameras, notebook, pager, cellular devices, Personal Digital Assistant (PDA), smartphone, server computers, mainframe computers, network PC, wearable device and the like.

The one or more computing devices use one or more available network connections for establishing the network connectivity with the Internet 104. The one or more available network connections include, but are not limited to, wired network connections and wireless network connections. The wired network connections include, but are not limited to, dial-up connections, Virtual Private Network (VPN) connections, local area connections, direct connections, incoming connections, Digital Enhanced Cordless Telecommunications (DECT), Ethernet connections, fiber optics, serial connections, Integrated Services Digital Network (ISDN) connection, Digital Subscriber Line (DSL) connection, High Definition Multimedia Interface (HDMI), X10™, Multimedia Over Coax (MoCA), FireWire connections, Universal Serial Bus (USB) connections, and Insteon connections and the like. The wireless network connections include, but are not limited to, WiFi, Wireless Local Area Network (WLAN), second-generation wireless connection (2G), third-generation wireless connection (3G), fourth-generation wireless connection (4G), Global System for Mobile (GSM) communications, cellular network connections, Internet over Satellite (IoS), Z-wave connection, Wavenis connection, Long Term Evaluation (LTE) connection, Code Division Multiple Access (CDMA) connection and the like.

In an embodiment, the one or more available network connections comprise one or more network parameters. The one or more network parameters include, but are not limited to, transmit power of the network connection, Quality of Service (QoS) of the network connection, bandwidth details of the network connection, traffic usage of the network connection, time latency as measured by number of packet hops, cost for per byte of data of the network connection and operational mode of the network connection. The transmit power of the network connection refers to power in Decibel milliWatt (dBmW) units required to transmission of data packets. The QoS of the network connection refers to performance of the network connection for transmission of the data packets. The bandwidth details of the network connection refer to bit rate for communication of the data packets in bit per seconds. The traffic usage of the network connection refers to network traffic which depends on amount and type of data traffic of a particular network connection. The measurement of the traffic usage of the network connection optimizes bandwidth management. The time latency as measured by number of packet hops refers to time delay incurred in transmission of the data packets. The cost for per byte of data of the network connection refers to cost factors involved in propagating the data packets. The operational mode of the network connection refers to uplink mode of the network connection and downlink mode of the network connection.

In one implementation, the network connectivity of the one or more computing devices is established by using a network gateway device (not shown in FIG. 1). Particularly, the network connectivity through the one or more available network connections is established by using the network gateway device. The network gateway device includes, but is not limited to, Network Interface Controller (NIC), dongles, repeaters, hubs, bridges, switches, routers, modems and firewalls. For example, a tablet uses a WiFi connection for connecting to the Internet 104. The WiFi connection is facilitated to the tablet by using a WiFi modem or router. Another example, a PC connected to the Internet 104 through a USB connection by using a USB dongle. A smartphone establishes the connection with the Internet 104 through a 4G network connection. In an embodiment, the network gateway device is configured with a network manager (not shown) which establishes the network connectivity with the Internet 104.

In one non-limiting exemplary embodiment, the one or more available network connections of the one or more computing devices may take long duration in providing the communication and processing of data i.e. establishing the network connectivity with the Internet 104. For example, the tablet using the WiFi connection or the PC using the USB connection may fail to connect with the Internet 104. In an embodiment, the present disclosure facilitates the one or more computing devices to use the one or more network connections of the other one or more computing devices for network connectivity with the Internet 104. For example, consider bandwidth of the WiFi connection in a tablet is low. Then, the tablet can use WiFi connection of a smartphone having high bandwidth as required by the tablet. In one implementation, the one or more computing devices which require usage of the one or more available network connections of the other one or more computing devices are referred as one or more second computing devices 101. For example, the tablet which requires WiFi connection of high bandwidth from the smartphone is a second computing device 101. Further, the one or more computing devices which facilitate usage of the one or more available network connections to the one or more second computing devices 101 are referred as one or more first computing devices 103. For example, the smartphone facilitating WiFi connection for usage to the tablet is a first computing device 103. In such a case, the one or more second computing devices 101 are considered to be as "passive devices" and the one or more first computing devices 103 are considered to be as "active devices". Specifically, computing devices facilitating the network connectivity directly with the Internet 104 are called active devices. Further, computing devices are called passive devices when the computing devices connect to the Internet 104 through the one or more network connections of the active devices.

In an embodiment, the one or more second computing devices 101 are connected to the one or more first computing devices 103 through a network channel 102 for establishing the network connectivity with the Internet 104. The network channel 102 includes, but is not limited to, WiFi, Wireless Local Area Network (WLAN), Bluetooth, ZigBee™, Near Field Communication (NFC), Infrared Data Association (IRDA) connection, Radio Frequency Identification (RFID) connection, RuBee™ connection and the like. For example, a tablet being the second computing device is connected to the smartphone being the first computing device using NFC or Bluetooth. In an embodiment, the network channel 102 refers to a channel which establishes point to point or device to device connection. Further, the network channel 102 may provide a short distance connection and/or a long distance connection. For example, the short distance connection can be facilitated by Bluetooth and the long distance connection can be facilitated by WiFi connection.

In an embodiment, the network channel 102 acts as a medium through which one of the one or more first computing devices 103 receive a connection request comprising connection request parameters from one of the one or more second computing devices 101. The connection request parameters include, but are not limited to, speed, bandwidth, strength, latency, throughput, jitter, duration/longevity of connection and capacity required by the one or more second computing device 101 for network connectivity. For example, considering the one or more available network connections of the one of the one or more second computing devices 101 fails to connect to the Internet 104. Then, the one of the one or more second computing devices 101 transmits the connection request to the one of the one or more first computing devices 103 through the network channel 102. The one of the one or more first computing devices 103 determines one of the one or more available network connections which can serve the connection request parameters. Then, the one of the one or more first computing devices 103 uses the one of the one or more available network connections. The one of the one or more second computing devices 101 is connected to the Internet 104 by using the one of the one or more available network connections.

Figure 2:
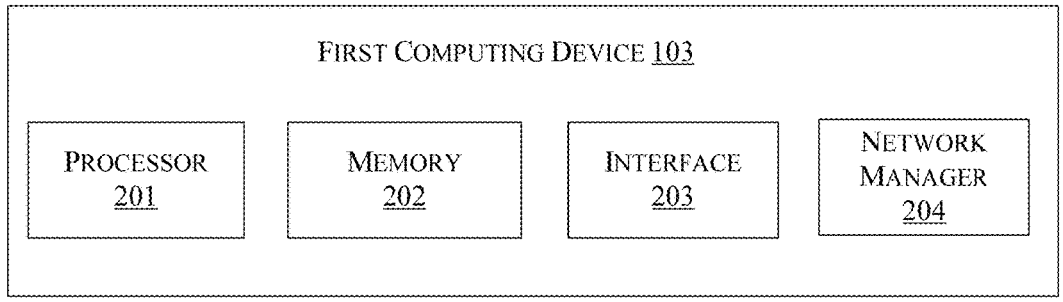
FIG. 2 illustrates a block diagram of a first computing device for facilitating network connectivity of one or more second computing devices with Internet in accordance with some embodiments of the present disclosure.

FIG. 2 illustrates a block diagram of the first computing device 103 for facilitating the network connectivity of the one or more second computing devices 101 with the Internet 104 in accordance with some embodiments of the present disclosure.

In one implementation, the first computing device 103 includes a central processing unit ("CPU" or "processor") 201, a memory 202, an interface 203 and a network manager 204. The processor 201 may comprise at least one data processor for executing program components and for executing connection request for network connectivity of the one or more second computing devices 101. The interface 203 is coupled with the processor 201. The data like the one or more network parameters of the one or more available network connections are broadcasted to the one or more second computing devices 101 through the interface 203. The data like the connection request comprising the connection request parameters are received by the first computing device 103 through the interface 203. In an embodiment, the connection request is received through the network channel 102 by the interface 203. The memory 202 is communicatively coupled to the processor 201. The memory 202 stores processor-executable instructions to facilitate the one or more available network connections to the one or more second computing devices 101.

Figure 3:
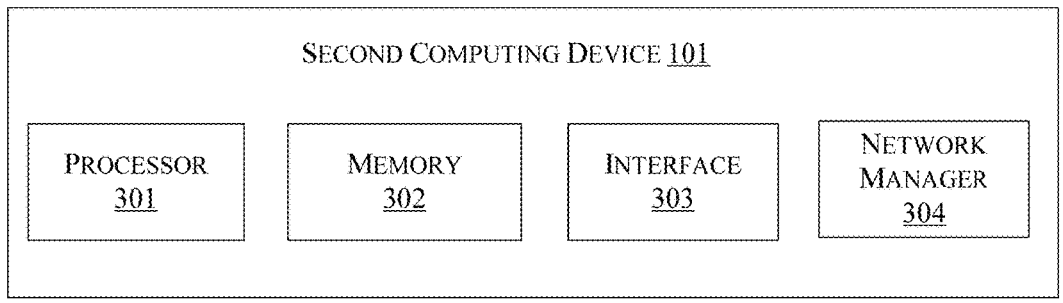
FIG. 3 illustrates a block diagram of a second computing device for establishing network connectivity with Internet using one or more first computing devices in accordance with some embodiments of the present disclosure.

FIG. 3 illustrates a block diagram of the second computing device 101 for establishing the network connectivity with the Internet 104 through the one or more first computing devices 103 in accordance with some embodiments of the present disclosure.

In one implementation, the second computing device 101 includes a central processing unit ("CPU" or "processor") 301, a memory 302, an interface 303 and a network manager 304. The processor 301 may comprise at least one data processor for executing program components and for transmitting connection request for network connectivity. The interface 303 is coupled with the processor 301. The data like the one or more network parameters are received from the one or more first computing devices 103 through the interface 303. Also, the data like the connection request comprising the connection request parameters are transmitted by the second computing device 101 through the interface 303. In an embodiment, the connection request is transmitted through the network channel 102 by the interface 303. The memory 302 is communicatively coupled to the processor 301. The memory 302 stores processor-executable instructions to establish the network connectivity with the Internet 104 by using the one or more available network connections of the one or more first computing devices 101.

Figure 4:
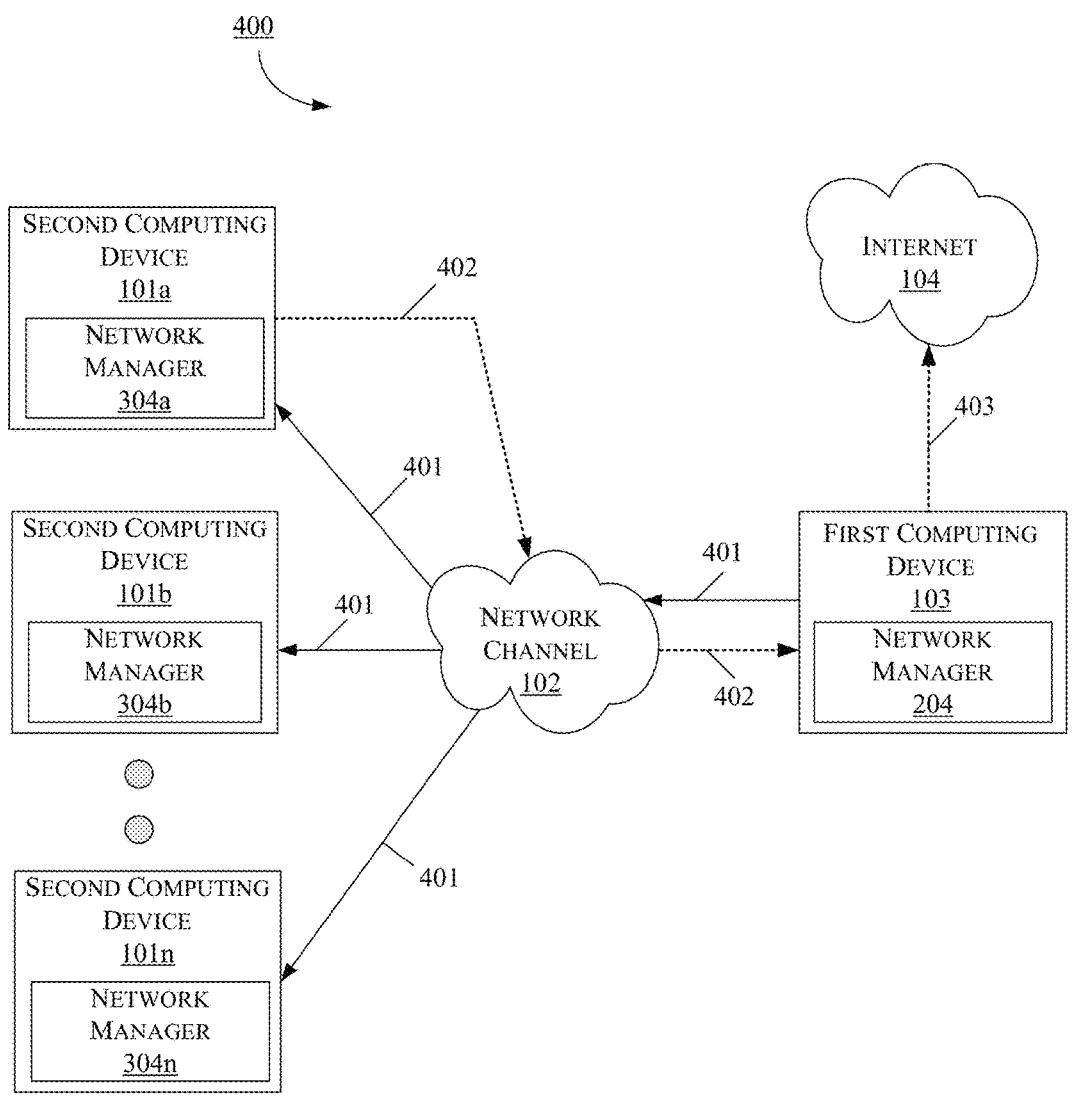
FIG. 4 illustrates a flow of facilitating network connectivity of one or more second computing devices with Internet by a first computing device in accordance with some embodiments of the present disclosure.

FIG. 4 illustrates a flow of facilitating network connectivity of the one or more second computing devices 101 with the Internet 104 by the first computing device 103 in accordance with some embodiments of the present disclosure. The first computing device 103 comprises the network manager 204 which identifies the one or more network parameters of the one or more available network connections. Considering, the first computing device 103 is connected to the one or more second computing devices 101 through the network channel 102. Each of the one or more second computing devices 101 comprise a network manager 304a, 304b, ..., 304n. Specifically, the second computing device 101a comprises the network manager 304a, the second computing device comprises the network manager 304b and the second computing device 101n comprises the network manager 304n. Each of the one or more network parameters of each of the one or more available network connections is broadcasted to each of the one or more second computing devices 101. Particularly, each of the one or more network parameters is broadcasted to the second computing device 101a through the network channel 102 as shown by arrow 401. Each of the one or more network parameters of each of the one or more available network connections is broadcasted to the second computing device 101b and 101n through the network channel 102 as shown by arrow 401 respectively. The one or more second computing devices 101 requiring the network connectivity evaluate the one or more network parameters. Upon evaluating, one of the one or more second computing devices 101 requiring the network connectivity transmits the connection request comprising the connection request parameters to the first computing device 103. Considering the second computing device 101a requires the network connectivity through the one or more available network connectivity. The first computing device 103 receives the connection request comprising the connection request parameters from the second computing device 101a through the network channel 102 as shown by arrow 402. Now, the first computing device 103 determines one of the one or more available network connections capable of serving the connection request parameters. Upon determining, the first computing device 103 facilitates the one of the one or more available network connections to the one of the one or more second computing devices 101. Specifically, the first computing device 103 facilitates the one of the one or more available network connections to the second computing device 101a for connecting to the Internet as shown by arrow 403.

In an embodiment, the first computing device 103 provides one or more updated network parameters of the one or more available network connections to the one or more second computing devices 101. The one or more updated network parameters are provided subsequent to facilitating the one of the one or more network connections for network connectivity. Particularly, upon usage of the one or more available network connections for the network connectivity, the one or more network parameters changes or are updated. Hence, the one or more updated parameters are observed or evaluated by the first computing device 103 and broadcasted to the one or more second computing devices 101.

In an embodiment, the first computing device 103 transmits the connection request to other one or more second computing devices which can act as active devices and which can provide network connectivity. The connection request is transmitted upon identifying a failure in facilitating the one of the one or more available network connections of the first computing device 103. The other one or more second computing devices facilitate network connectivity to the one of the one or more second computing devices i.e. the second computing device 101a.

In an embodiment, the first computing device 103 notifies usage of the one of the one or more available network connections to the other one or more second computing devices 101. Considering the second computing device 101a is using the one of the one or more available network connections. The first computing device 103 notifies the status of usage of the one of the one or more available network connections to the other second computing devices such as 101b, ..., 101n.

In an embodiment, the first computing device 103 determines the one of the one or more available network connections for the kind of web-based application and/or type of data to be transmitted using the network connectivity. For example, assuming an email is to be transmitted using email application. Considering, the first computing device 103 comprises a WiFi connection and a GSM connection. Based on the type of data to be transmitted and parameters of the data, the first computing devices determine which one of the available network connection to be used. For example, for transmitting the email, the first computing device 103 determines whether WiFi is capable of transmitting and/or GSM connection is capable of serving the network connectivity.

Figure 5:
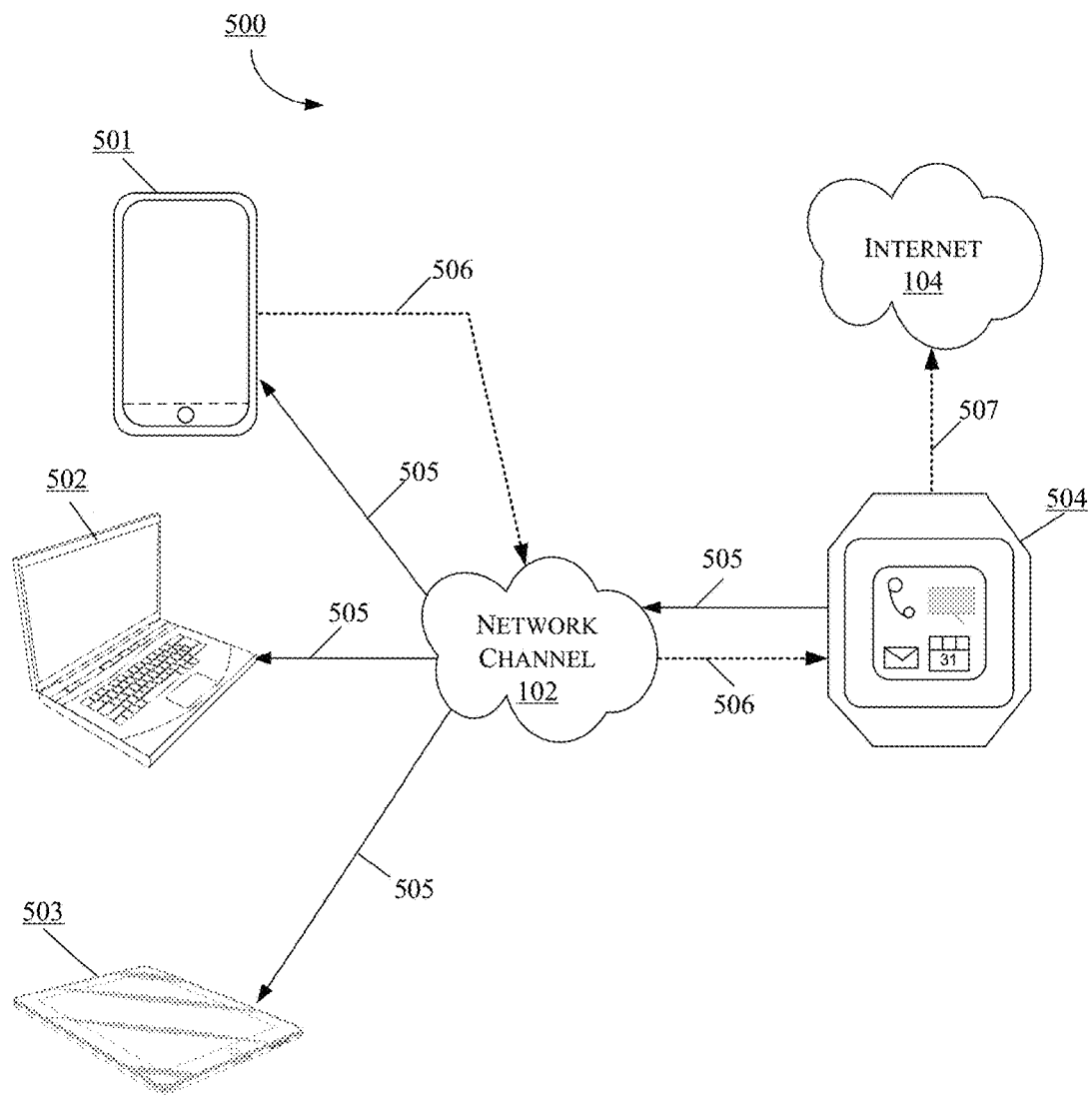
FIG. 5 illustrates an exemplary diagram showing a flow of facilitating network connectivity of a smartphone with Internet by a smartwatch in accordance with some embodiments of the present disclosure.

FIG. 5 illustrates an exemplary diagram showing a flow of facilitating network connectivity of a smartphone 501 with Internet 104 by a smartwatch 504 in accordance with some embodiments of the present disclosure. Considering, a smartwatch 504 is a first computing device comprising a network manager (not shown in FIG. 5). Now, assuming, the smartwatch 504 comprises three network connections namely WiFi, 4G and Ethernet connections. The bandwidth and transmit power of the WiFi connection is 8 mega bit per seconds and 15 dBmW. The bandwidth and transmit power of the 4G is 10 mega bit per seconds and 15 dBmW. The bandwidth and the transmit power of the Ethernet connection is 12 mega bit per seconds and 12 dBmW. Considering the smartwatch 504 is connected to the smartphone 501 through a Bluetooth 102. Also, considering, the smartphone 504 is connected to the laptop 502 through a NFC 102 and the tablet 503 through a WiFi 102. The smartwatch 504 broadcast the bandwidth and transmit power of each of the WiFi, 4G and Ethernet connections to each of the smartphone 501, the laptop 502 through the NFC 102 and the tablet 503. The broadcasting of the bandwidth and the transmit power to each of the WiFi, 4G and Ethernet connections is shown by arrows 505. Assuming, the smartphone 501 wishes to send Multimedia Message Service (MMS) which requires bandwidth of the 9 mega bit per seconds and the transmit power 13 dBmW. Thus, the smartphone 501 evaluates the bandwidth and the transmit power of each of the WiFi, 4G and Ethernet connections received from the smartwatch 504. Upon evaluation, the smartphone 501 transmits the connection request with connection request parameters specifying type of data packet as MMS, bandwidth of 9 mega bit per seconds and the transmit power of 13 dBmW. The connection request with connection request parameters are received by the smartwatch 504. Now, the smartwatch 504 determines which one of the WiFi, 4G and the Ethernet is capable of serving the MMS requiring bandwidth of 9 mega bit per seconds and the transmit power of 13 dBmW. Upon determining, the smartwatch 504 identifies the 4G connection having bandwidth of 10 mega bit per seconds and the transmit power of 15 dBmW to be used. Therefore, in such a way, the smartwatch 504 identifies the 4G connection to be capable of serving the transmission of MMS with bandwidth of 9 mega bit per seconds and the transmit power of 13 dBmW. Hence, the smartwatch 504 facilitates the network connectivity of the smartphone 501 with the Internet 104 through the 4G connection.

In an embodiment, the smartwatch 504 provides one or more updated network parameters of the one or more available network connections to the smartphone 501, the laptop 502 and the tablet 503. Considering the bandwidth and the transmit power of the 4G connection after usage is of 5 bit per seconds and 11 dBmW. The updated bandwidth and the transmit power of the 4G connection subsequent to facilitating for the network connectivity is notified to the smartphone 501, the laptop 502 and the tablet 503.

In an embodiment, the smartwatch 504 transmits the connection request to the tablet 503 which can act as active device through which network connectivity can be facilitated for the smartphone 501. The connection request is transmitted to the tablet 503 upon identifying a failure in facilitating the 4G connection.

In an embodiment, the smartwatch 504 notifies usage i.e. busy status of the 4G connection to the laptop 502 and the tablet 503.

Figure 6:
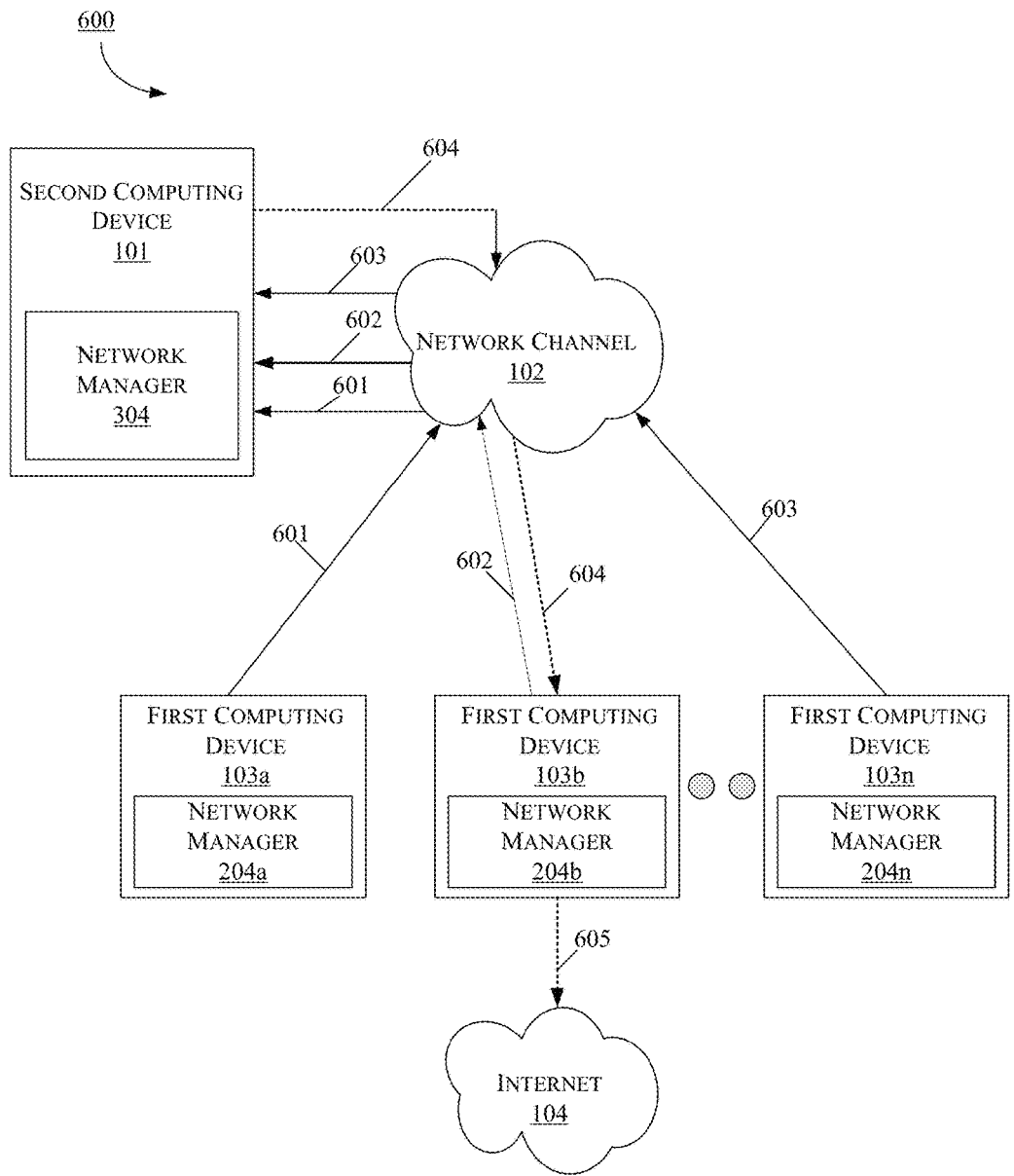
FIG. 6 illustrates a flow of establishing network connectivity of a second computing device with Internet using one or more first computing devices in accordance with some embodiments of the present disclosure.

FIG. 6 illustrates a flow of establishing network connectivity of the second computing device 101 with the Internet 104 using the one or more first computing devices 103 in accordance with some embodiments of the present disclosure. The second computing device 101 comprises the network manager 304. The second computing device 101 is connected to the one or more first computing devices 103 through the network channel 102. Each of the one or more first computing devices 103 comprises the network manager 204a, 204b, . . . , 204n. Particularly, the first computing device 103a comprises the network manager 204a, the first computing device 103b comprises the network manager 204b and the first computing device 103n comprises the network manager 204n. The second computing device 101 identifies the one or more first computing devices 103 connected through the network channel 102. The second computing device 101 receives the one or more network parameters of one or more available network connections from the one or more first computing devices 103. Particularly, the one or more network parameters of the one or more available network connections received from the first computing device 103a is referred by an arrow 701. The one or more network parameters of the one or more available network connections received from the first computing device 103b is referred by arrow 702. And the one or more network parameters of the one or more available network connections received from the first computing device 103n is referred by arrow 703. Upon receiving the one or more network parameters, the second computing device 101 determines one of the one or more first computing devices 103 capable of serving the network connectivity. For example, the second computing device 101 determines the first computing device 103b to be capable of serving the network connectivity based on the one or more network parameters. Now, the second computing device 101 transmits the connection request to one of the one or more first computing devices 103. Particularly, the second computing device 101 transmits the connection request to the first computing device 103b as shown by arrow 604. The first computing device 103b facilitates the network connectivity for the second computing device 101 by using one of the one or more available network connections.

In an embodiment, the second computing device 101 receives the one or more updated network parameters of the one or more available network connections subsequent to establishing the one of the one or more network connections.

In an embodiment, the second computing device 101 is notified the usage of the one of the one or more available network connections by the first computing devices 103a.

Figure 7:
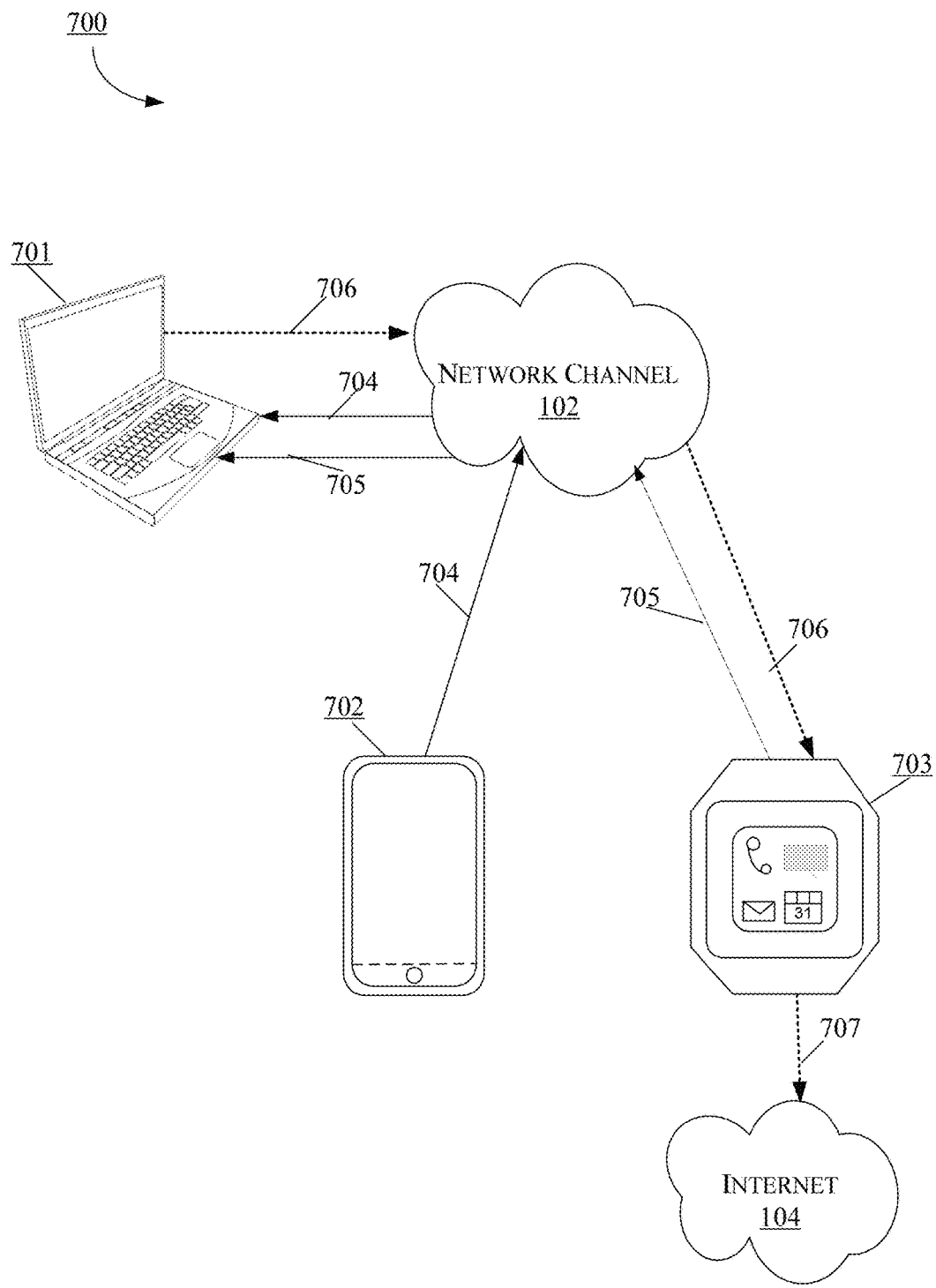
FIG. 7 illustrates an exemplary diagram showing a flow of establishing network connectivity of a laptop with Internet using a smartwatch in accordance with some embodiments of the present disclosure.

FIG. 7 illustrates an exemplary diagram showing a flow of establishing network connectivity of a laptop 701 with the Internet 104 using a smartwatch 703 in accordance with some embodiments of the present disclosure. The laptop 701 comprises the network manager (not shown). The laptop 701 is connected to the smartphone 702 and the smartwatch 703 through the network channel 102. Each of the smartphone 702 and the smartwatch 703 comprises the network manager (not shown). The laptop 701 identifies the smartphone 702 and the smartwatch 703 connected through the network channel 102. Considering, the smartphone 702 has 4G connection available with network parameters as bandwidth of 8 mega bit per seconds and transmit power of 15 dBmW. The smartwatch 703 has WiFi connection available with bandwidth of 10 mega bit per seconds and transmit power of 10 dBmW. The laptop 701 receives network parameters such as bandwidth of 8 mega bit per seconds and transmits power of 15 dBmW of the 4G connection from the smartphone 702 as shown by arrow 704. Also, laptop 701 receives network parameters such as bandwidth of 10 mega bit per seconds and transmits power of 10 dBmW of the WiFi connection from the smartwatch 703 as shown by arrow 705. The laptop 701 determines one of the smartphone 702 and the smartwatch 703 capable of serving the network connectivity. The laptop 701 wishes to transmit connection request of MMS type data packet with connection request parameters such as bandwidth of 8 mega bit per seconds and transmit power of 9 dBmW. Thus, the laptop 701 transmits the connection request to smartwatch 703 as shown by arrow 706. The smartwatch 703 facilitates the network connectivity for the laptop 701 by using WiFi connection as shown by arrow 707.

Figure 8:
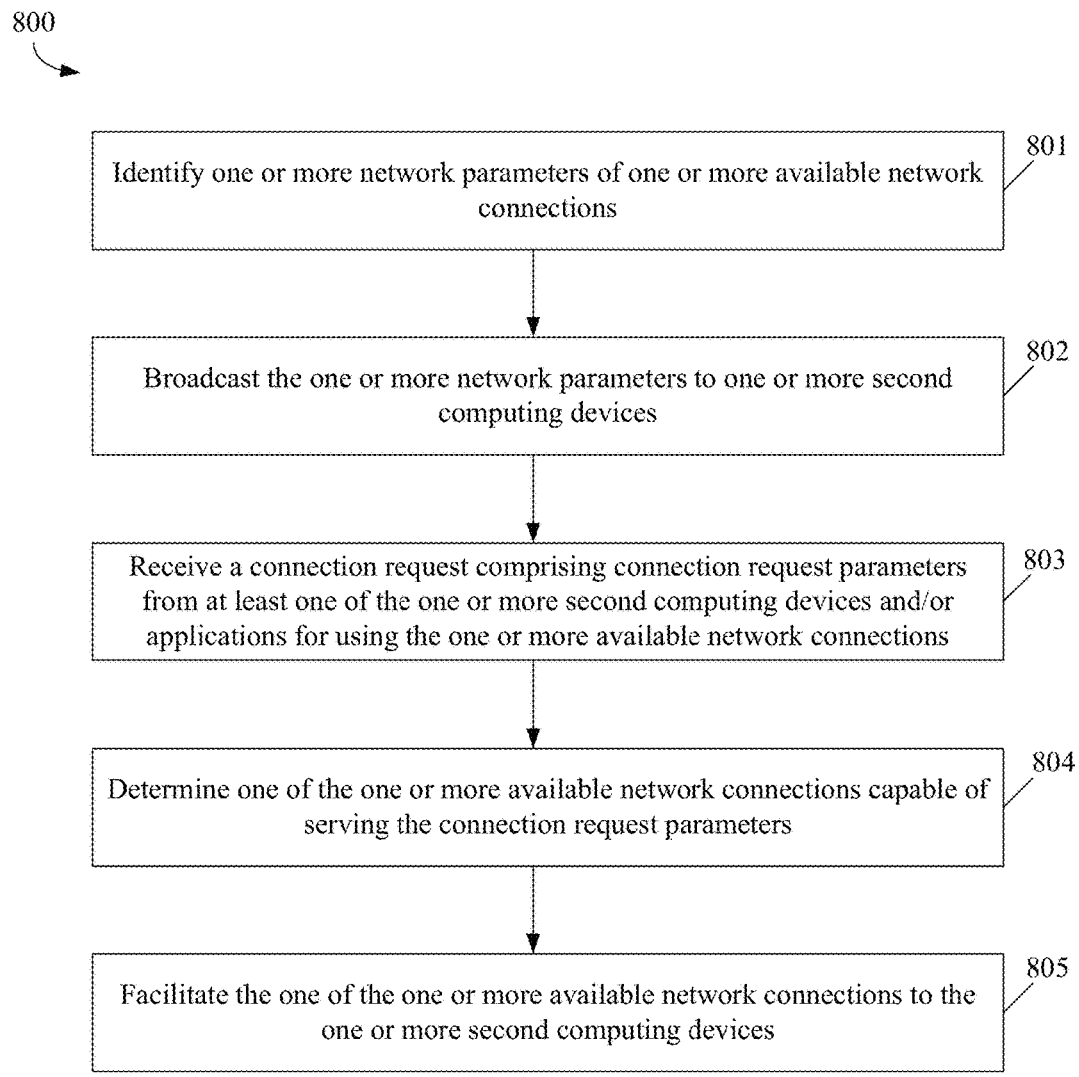
FIG. 8 illustrates a flowchart of method for facilitating network connectivity of one or more second computing devices with Internet by a first computing device in accordance with an embodiment of the present disclosure.
Figure 9:
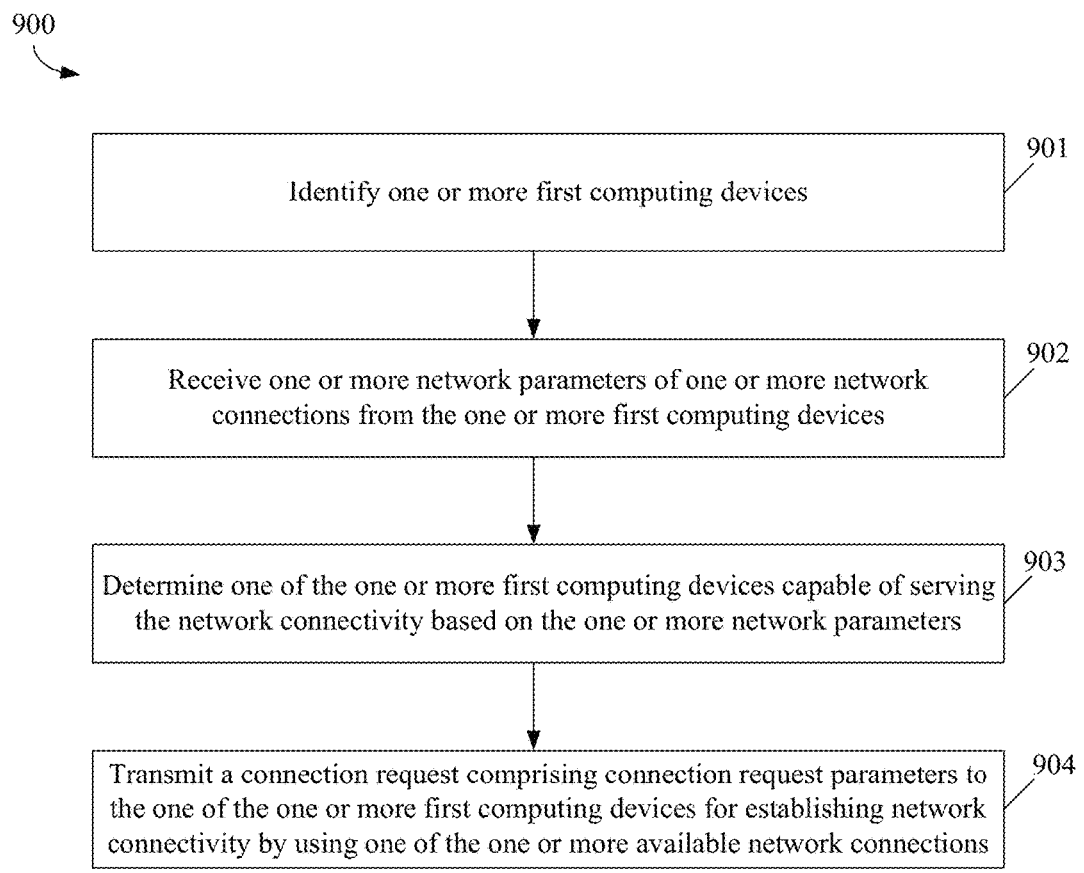
FIG. 9 illustrates a flowchart of method for establishing network connectivity of a second computing device with Internet by using one or more first computing devices in accordance with an embodiment of the present disclosure.

As illustrated in FIGS. 8 and 9, the methods 800 and 900 comprises one or more blocks for facilitating and establishing network connectivity by the first computing device 103 and the one or more second computing devices 101 respectively. The methods 800 and 900 may be described in the general context of computer executable instructions. Generally, computer executable instructions can include routines, programs, objects, components, data structures, procedures, modules, and functions, which perform particular functions or implement particular abstract data types.

The order in which the methods 800 and 900 are described is not intended to be construed as a limitation, and any number of the described method blocks can be combined in any order to implement the methods 800 and 900. Additionally, individual blocks may be deleted from the methods 800 and 900 without departing from the scope of the subject matter described herein. Furthermore, the methods 800 and 900 can be implemented in any suitable hardware, software, firmware, or combination thereof.

FIG. 8 illustrates a flowchart of method 800 for facilitating network connectivity of one or more second computing devices 101 with the Internet 104 by the first computing device 103 in accordance with an embodiment of the present disclosure.

At step 801, the first computing device 103 identifies the one or more network parameters of one or more available network connections.

At step 802, the first computing device 103 broadcast the one or more network parameters to the one or more second computing devices 101 through the network channel 102. In an embodiment, the one or more second computing devices 101 are connected to the first computing device 103 through the network channel 102.

At step 803, the first computing device 103 receives the connection request comprising the connection request parameters from the one of the one or more second computing devices 101 and/or applications for using the one or more available network connections. In an embodiment, the one or more second computing devices 101 evaluate the one or more network parameters for transmitting the connection request to the first computing device 103.

At step 804, the first computing device 103 determines the one of the one or more available network connections capable of serving the connection request parameters.

At step 805, the first computing device 103 facilitates the one of the one or more available network connections to the one of the one or more second computing devices 101.

In an embodiment, the first computing device 103 provides the one or more updated network parameters to the one or more second computing devices 101 subsequent to facilitating the one or more network connections.

In an embodiment, the first computing device 103 transmits the connection request to the one or more second computing devices 101 to facilitate network connectivity to the one of the one or more second computing devices upon identifying a failure in facilitating the one of the one or more available network connections.

FIG. 9 illustrates a flowchart of method 900 for establishing network connectivity of the second computing device 101 with the Internet 104 by using the one or more first computing devices 103 in accordance with an embodiment of the present disclosure.

At step 901, the second computing device 101 identifies the one or more first computing devices 103. In an embodiment, the one or more first computing devices 103 are connected to the second computing device 101 through the network channel 102.

At step 902, the second computing device 101 receives the one or more network parameters of one or more available network connections from the one or more first computing devices 103.

At step 903, the second computing device 101 determines the one of the one or more first computing devices 103 capable of serving the network connectivity based on the one or more network parameters.

At step 904, the second computing device 101 transmits the connection request comprising the connection request parameters to the one of the one or more first computing devices 103 for establishing network connectivity by using one of the one or more available network connections.

Figure 10:
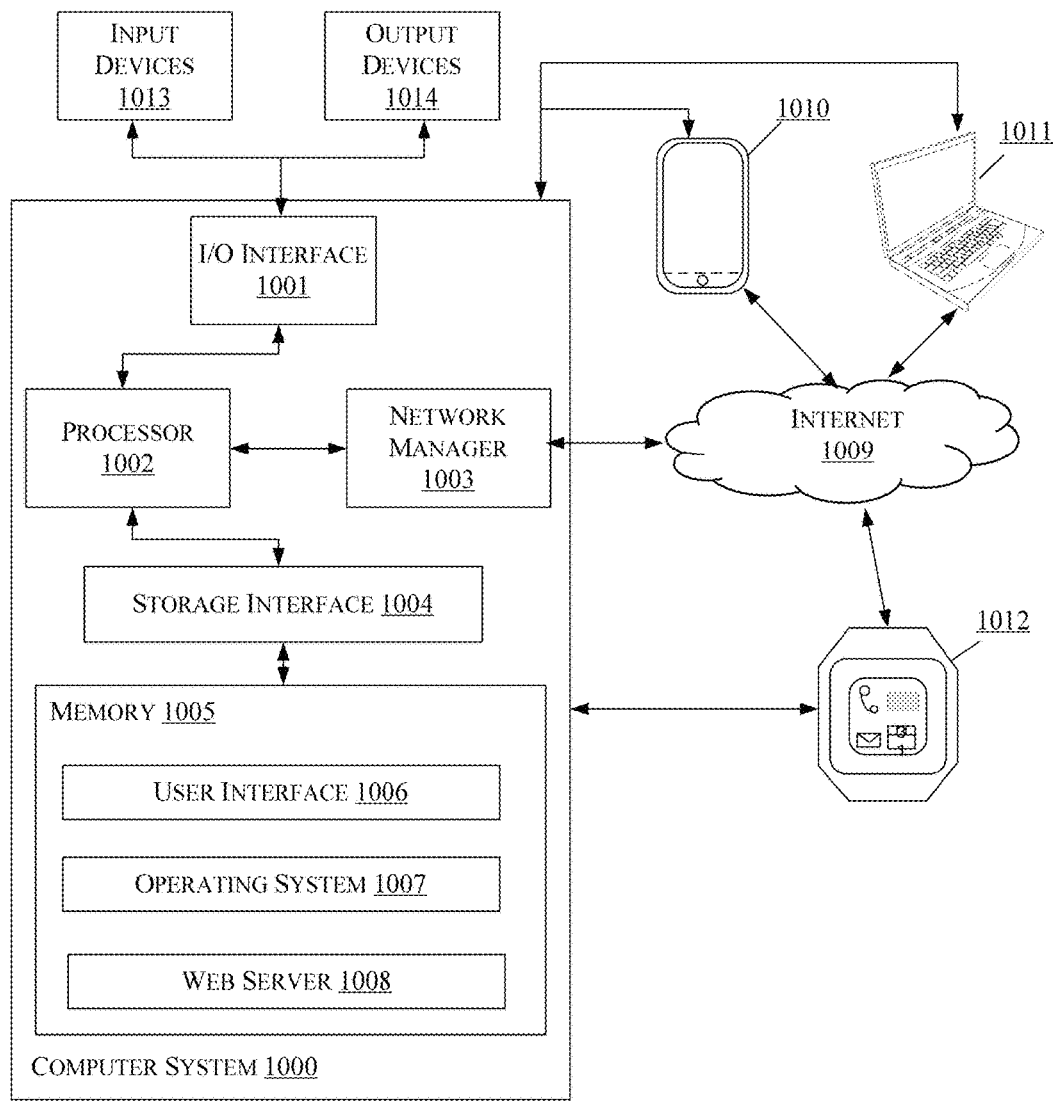
FIG. 10 illustrates a block diagram of an exemplary computer system for implementing embodiments consistent with the present disclosure.

In an embodiment, the second computing device 101 receives the one or more updated network parameters of the one or more available network connections subsequent to establishing the one of the one or more network connections Computer System FIG. 10 illustrates a block diagram of an exemplary computer system 1000 for implementing embodiments consistent with the present disclosure. In an embodiment, the computer system 1000 is used to implement the first computing device 103 and the second computing device 101 independently. The network connectivity is managed by the computer system 1000 to the other one or more second computing devices and the other one or more first computing devices. The computer system 1000 may comprise a central processing unit ("CPU" or "processor") 1002. The processor 1002 may comprise at least one data processor for executing program components for facilitating network connectivity with Internet 1009. The processor 1002 may include specialized processing units such as integrated system (bus) controllers, memory management control units, floating point units, graphics processing units, digital signal processing units, etc.

The processor 1002 may be disposed in communication with one or more input/output (I/O) devices (1013 and 1014) via I/O interface 1001. The I/O interface 1001 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 1001, the computer system 1000 may communicate with one or more I/O devices (1013 and 1014). For example, the input device 1013 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. The output device 1014 may be a printer, fax machine, video display (e.g., cathode ray tube (CRT), liquid crystal display (LCD), light-emitting diode (LED), plasma, or the like), audio speaker, etc.

In some embodiments, the processor 1002 may be disposed in communication with a Internet 1009 via a network manager 1003. The network manager 1003 may communicate with the Internet 1009. The network manager 1003 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The internet connectivity is established using a communication network (not shown) which may include, without limitation, a direct interconnection, local area network (LAN), wide area network (WAN), wireless network (e.g., using Wireless Application Protocol), the Internet, etc. Using the network manager 1003 and the communication network, the computer system 1000 may facilitate the network connectivity to the other one or more second computing device and the other one or more first computing device. The one or more second computing devices 101 and the first computing devices 103 may include, without limitation, personal computer(s), server(s), fax machines, printers, scanners, various mobile devices such as cellular telephones, smartphones, tablet computers, eBook readers, laptop computers, notebooks, gaming consoles, or the like. In the illustrated FIG. 10, the computer system 1000 is facilitating network connectivity to the smartphone 1010, the laptop 1011 and the smartwatch 1012.

In some embodiments, the processor 1002 may be disposed in communication with a memory 1005 (e.g., RAM, ROM, etc. not shown in FIG. 10) via a storage interface 1004. The storage interface 1004 may connect to memory 1005 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory 1005 may store one or more network parameters of the one or more available network connections.

The operating system 1007 may facilitate resource management and operation of the computer system 1000. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 1006 may facilitate display, execution, interaction, manipulation, or operation of program components through textual or graphical facilities. For example, user interfaces may provide computer interaction interface elements on a display system operatively connected to the computer system 1000, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 1000 may implement a web browser 1007 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 1000 may implement a mail server 1008 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 1000 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

Advantages of the embodiment of the present disclosure are illustrated herein.

Embodiments of the present disclosure facilitate efficient usage of the network connections with the Internet 104.

Embodiments of the present disclosure provide dynamic method for network connectivity with the Internet 104.

Embodiments of the present disclosure optimize power consumption of the computing devices.

Embodiments of the present disclosure provide successful connection of the Internet connectivity.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIGS. 8 and 9 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Network Architecture |
| 101a, 101b, . . . , 101n | Second Computing Devices |
| 102 | Network Channel |
| 103a, 103b, . . . , 103n | First Computing Devices |
| 104 | Internet |
| 201 | Processor |
| 202 | Memory |
| 203 | Interface |
| 204 | Network Manager |
| 301 | Processor |
| 302 | Memory |
| 303 | Interface |
| 304 | Network Manager |
| 501 | Smartphone |
| 502 | Laptop |
| 503 | Tablet |
| 504 | Smartwatch |
| 701 | Laptop |
| 702 | Smartphone |
| 703 | Smartwatch |
| 1000 | Computer System |
| 1001 | I/O Interface |
| 1002 | Processor |
| 1003 | Network Manager |
| 1004 | Storage interfaces |
| 1005 | Memory |
| 1006 | User Interface |
| 1007 | Operating System |
| 1008 | Web Server |
| 1009 | Network |
| 1010 | Smartphone |
| 1011 | Laptop |
| 1012 | Smartwatch |
| 1013 | Input Device |
| 1014 | Output Device |

What is claimed is:

1. A method for facilitating network connectivity, the method comprising:
    identifying, by a first mobile device, one or more network parameters of one or more available network connections associated with the first mobile device that is directly connected to internet;
    broadcasting, by the first mobile device, the one or more network parameters to one or more second mobile devices, wherein the one or more second computing devices are connected to the first mobile device via a network channel using a short distance communication;
    receiving, by the first mobile device via the network channel, a connection request comprising connection request parameters from one of the one or more second mobile devices and details related to applications running on the one of the one or more second mobile devices for using the one or more available network connections;
    determining, by the first mobile device, one of the one or more available network connections capable of serving the connection request parameters and the applications running on the one of the one or more second mobile devices, and wherein each of the one or more available network connections operate on a different communication technology; and facilitating, by the first mobile device, the one of the one or more available network connections to the one of the one or more second mobile devices for establishing a new network connectivity via the first mobile device to the one of the one or more second mobile devices.

2. The method as claimed in claim 1, wherein the one or more second mobile devices evaluates the one or more network parameters for transmitting the connection request to the first mobile device.

3. The method as claimed in claim 1 further comprising providing by the first mobile device, one or more updated network parameters of the one or more available network connections to the one or more second mobile devices subsequent to facilitating or observing changes in the one of the one or more network connections.

4. The method as claimed in claim 1 further comprising transmitting by the first mobile device, the connection request to one or more second mobile devices to facilitate network connectivity to the one of the one or more second mobile devices upon identifying the failure in facilitating the one of the one or more available network connections of the one or more second mobile devices.

5. The method as claimed in claim 1, wherein the one or more network parameters are selected from at least one of transmit power of the network connection, Quality of Service (QoS) of the network connection, bandwidth details of the network connection, traffic usage of the network connection, time latency as measured by number of packet hops, cost for per byte of data of the network connection and operational mode of the network connection.

6. The method as claimed in claim 1, wherein the connection request parameters comprises at least one of speed, bandwidth, strength, latency, throughput, jitter, duration/longevity of connection and capacity required by the one of the one or more second mobile device for network connectivity.

7. A first mobile device for facilitating network connectivity, comprising:
a processor;
a memory, wherein the memory coupled to the processor which are configured to execute programmed instructions stored in the memory comprising:
identify one or more network parameters of one or more available network connections associated with the first mobile device that is directly connected to internet;
broadcast the one or more network parameters to one or more second mobile devices, wherein the one or more second computing devices are connected to the first mobile device via a network channel using a short distance communication;
receive a connection request comprising connection request parameters from one of the one or more second mobile devices and details related to applications running on the one of the one or more second mobile devices for using the one or more available network connections;
determine one of the one or more available network connections capable of serving the connection request parameters and the applications running on the one of the one or more second mobile devices, and wherein each of the one or more available network connections operate on a different communication technology; and facilitate the one of the one or more available network connections to the one of the one or more second mobile devices for establishing a new network connectivity via the first mobile device to the one of one or more second mobile devices.

8. The first mobile device as claimed in claim 7 receives the connection request from the one of the one or more second mobile devices upon evaluation of the one or more network parameters by the one of the one or more second mobile devices.

9. The first mobile device as claimed in claim 7 is further configured to provide one or more updated network parameters of the one or more available network connections to the one or more second mobile devices subsequent to facilitating the one of the one or more network connections.

10. The first mobile device as claimed in claim 7 is further configured to transmit the connection request to one or more second mobile devices to facilitate network connectivity to the one of the one or more second mobile devices upon identifying a failure in facilitating the one of the one or more available network connections.

11. The first mobile device as claimed in claim 7, wherein the one or more network parameters are selected from at least one of transmit power of the network connection, Quality of Service (QoS) of the network connection, bandwidth details of the network connection, traffic usage of the network connection, latency as measured by number of packet hops, cost for per byte of data of the network connection and operational mode of the network connection.

12. The first mobile device as claimed in claim 7, wherein the connection request parameters comprises at least one of speed, bandwidth, strength, latency, throughput, jitter, duration/longevity of connection and capacity required by the second mobile device for network connectivity.

13. A method for establishing network connectivity comprising:
identifying, by a second mobile device, one or more first mobile devices directly connected to the internet upon a failure in a current network connectivity from the second computing device to the internet, wherein the second computing device is connected to the one or more first mobile devices via a network channel using a short distance communication;
receiving, by the second mobile device, one or more network parameters of one or more available network connections from the one or more first mobile devices via the network channel;
determining, by the second mobile device, one of the one or more first devices capable of serving the network connectivity and an application running on the second mobile device based on the one or more network parameters; and
transmitting, by the second mobile device, a connection request comprising connection request parameters and details related to the application to the one of the one or more first mobile devices for establishing a new network connectivity to the second mobile device via the one of the one or more first mobile device by using one of the one or more available network connections capable of serving the connection request parameters and the application, wherein each of the one or more available network connections operate on a different communication technology.

14. The method as claimed in claim 13 further comprising receiving by the second mobile device, one or more updated network parameters of the one or more available network connections subsequent to establishing the one of the one or more network connections.

15. The method as claimed in claim 13, wherein the one or more network parameters are selected from at least one of transmit power of the network connection, Quality of Service (QoS) of the network connection, latency as measured by number of packet hops, bandwidth details of the network connection, traffic usage of the network connection, cost for per byte of data of the network connection and operational mode of the network connection.

16. The method as claimed in claim 13, wherein the connection request parameters comprises at least one of speed, bandwidth, strength, latency, throughput, jitter, duration or longevity of connection and capacity required by the one or more end mobile devices for network connectivity.

17. A second mobile device for establishing network connectivity, comprising:
 a processor;
 a memory communicatively coupled to the processor, wherein the memory stores processor-executable instructions, which, on execution, cause the processor to:
  identify one or more first mobile devices directly connected to the internet upon a failure in a current network connectivity from the second computing device to the internet, wherein the second computing device is connected to the one or more first mobile devices via a network channel using a short distance communication;
  receive one or more network parameters of one or more available network connections from the one or more first mobile devices via the network channel;
  determine one of the one or more first mobile devices capable of serving the network connectivity and an application running on the second mobile device based on the one or more network parameters; and
  transmit a connection request comprising connection request parameters and details related to the application to the one of the one or more first mobile devices for establishing a new network connectivity to the second mobile device via the one of the one or more first mobile device by using one of the one or more available network connections capable of serving the connection request parameters and the application, wherein each of the one or more available network connections operate on a different communication technology.

18. The second mobile device as claimed in claim 17 is further configured to receive one or more updated network parameters of the one or more available network connections subsequent to using the one of the one or more network connections.

19. The second mobile device as claimed in claim 17, wherein the one or more network parameters are selected from at least one of transmit power of the network connection, Quality of Service (QoS) of the network connection, bandwidth details of the network connection, traffic usage of the network connection, latency as measured by number of packet hops, cost for per byte of data of the network connection and operational mode of the network connection.

20. The second mobile device as claimed in claim 17, wherein the connection request parameters comprises at least one of speed, bandwidth, strength, latency, throughput, jitter, duration or longevity of connection and capacity required by the one or more end mobile devices for network connectivity.

21. A non-transitory computer readable medium having stored thereon instructions for establishing network connectivity comprising machine executable code which when executed by at least one processor, causes the processor to perform steps comprising:
 identifying one or more network parameters of one or more available network connections associated with a first mobile device directly connected to the internet;
 broadcasting the one or more network parameters to one or more second mobile devices, wherein the one or more second computing devices are connected to the one or more first mobile devices via a network channel using a short distance communication;
 receiving a connection request comprising connection request parameters from one of the one or more second mobile devices and details related to applications running on the one of the one or more second mobile devices for using the one or more available network connections;
 determining one of the one or more available network connections capable of serving the connection request parameters and the applications and wherein each of the one or more available network connections operate on a different communication technology; and
 facilitating the one of the one or more available network connections to the one of the one or more second mobile devices based on the determination for establishing a new network connectivity via the first mobile device to the one of the one or more second mobile devices.

22. The medium as claimed in claim 21, further comprising providing one or more updated network parameters of the one or more available network connections to the one or more second mobile devices subsequent to facilitating or observing changes in the one of the one or more network connections.

23. The medium as claimed in claim 21, further comprising transmitting the connection request to one or more second mobile devices to facilitate network connectivity to the one of the one or more second mobile devices upon identifying a failure in facilitating the one of the one or more available network connections.

24. A non-transitory computer readable medium having stored thereon instructions for establishing network connectivity comprising machine executable code which when executed by at least one processor, causes the processor to perform steps comprising:
 identifying one or more first mobile devices connected to the internet upon a failure in a current network connectivity from a second computing device to the internet, wherein the second computing device is connected to the one or more first mobile devices via a network channel using a short distance communication;
 receiving one or more network parameters of one or more available network connections broadcasted from the one or more first mobile devices via the network channel;
 determining one of the one or more first mobile devices capable of serving the network connectivity based on the one or more network parameters and an application running on the second mobile device; and
 transmitting a connection request comprising connection request parameters and details related to the application to the one of the one or more first mobile devices for establishing a new network connectivity to the second mobile device via the one of the one or more first mobile device by using one of the one or more available network connections capable of serving the connection request parameters and the application, wherein each of the one or more available network connections operate on a different communication technology.

25. The medium as claimed in claim 24, further comprising receiving one or more updated network parameters of the one or more available network connections subsequent to establishing the one of the one or more network connections.

\* \* \* \* \*